United States Patent

Shinmura et al.

[11] Patent Number: 6,012,511
[45] Date of Patent: *Jan. 11, 2000

[54] HEAT EXCHANGER FORMED BY BRAZING A PROVISIONAL ASSEMBLY AND METHOD OF MANUFACTURING THE SAME WITH A BRAZING DEFECT SUPPRESSED

[75] Inventors: Toshiharu Shinmura, Sawa-gun; Kazuhiko Suto, Ota; Kiyohito Hosoi, Isesaki, all of Japan

[73] Assignee: Sanden Corporation, Gunma, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/795,356

[22] Filed: Feb. 4, 1997

[30] Foreign Application Priority Data

Feb. 5, 1996 [JP] Japan .................................. 8-018764

[51] Int. Cl.[7] ...................................................... F28D 1/03
[52] U.S. Cl. ............................ 165/133; 165/153; 228/183
[58] Field of Search ................................... 165/133, 153, 165/176; 228/183

[56] References Cited

U.S. PATENT DOCUMENTS

| | | |
|---|---|---|
| 3,857,164 | 12/1974 | Chartet . |
| 3,951,328 | 4/1976 | Wallace et al. . |
| 4,831,701 | 5/1989 | Yutaka . |
| 4,901,907 | 2/1990 | Enokido et al. .......................... 228/183 |
| 5,005,285 | 4/1991 | Ishii . |
| 5,651,412 | 7/1997 | Williams et al. ......................... 164/479 |
| 5,654,042 | 8/1997 | Watanabe et al. ....................... 427/459 |

FOREIGN PATENT DOCUMENTS

| | | |
|---|---|---|
| 0347106 | 12/1989 | European Pat. Off. . |
| 0646759 | 4/1995 | European Pat. Off. . |
| 0694747 | 1/1996 | European Pat. Off. . |
| 6167984 | 5/1986 | Japan . |

*Primary Examiner*—Allen Flanigan
*Attorney, Agent, or Firm*—Baker & Botts, L.L.P.

[57] ABSTRACT

A plurality of tubes (3) for flowing a heat transfer tedium, a plurality of fins (4), and tanks (1) connected to the tubes (3) is provisionally assembled. Each of the tubes (3) comprises a pair of formed plates (3a, 3b) coupled to each other. Each of the formed plates (3a, 3b) has a peripheral portion (20) and a plurality of protrusions (14) formed on an inside thereof and having through-holes in top ends thereof. The outer surface of the provisional assembly is coated with a noncorrosive flux (40) in an amount rate of 3 g/m$^2$ or more on the base of the total area of the outer surfaces and inner surfaces of the tanks, fins and tubes. Then, the provisional assembly is subjected to a brazing treatment. The noncorrosive flux (40) is melted and flows to penetrate into the inside of the tubes (3) through the through-holes (45, 18a) to bond the paired formed plates to each other.

5 Claims, 10 Drawing Sheets

HEAT EXCHANGER FORMED BY BRAZING A PROVISIONAL ASSEMBLY AND METHOD OF MANUFACTURING THE SAME WITH A BRAZING DEFECT SUPPRESSED

BACKGROUND OF THE INVENTION

This invention relates to a heat exchanger for use in a heat core or an oil cooler mounted in an automobile or for use as an evaporator or a condenser in an air conditioner, such as an automobile air conditioner, and, in particular, to a heat exchanger comprising a tube for flowing a heat transfer medium therethrough. This invention also relates to a method of manufacturing the above-mentioned heat exchanger by brazing a provisional or core assembly including the tube.

Generally, an internal fluid flowing through a pipe Is heat-exchanged with an external fluid outside the pipe. The internal fluid is called a heat transfer medium which transports heat or cold between two areas. On the other hand, the external fluid is a fluid, such as air and liquid, to be heated or cooled. In an air heating system, the heat transfer medium is a heat carrier such as steam or warm water which transports heat, while the external fluid is air. In an air cooling system, the heat transfer medium is called a refrigerant for cooling the air by the heat exchange therebetween. The air to be heated or cooled will often be referred to as heat exchange air.

A conventional heat exchanger comprises a pair of tanks, a plurality of tubes connecting those tanks to each other, and a plurality of fins arranged between and attached onto the tubes. Each of fins has an outer surface exposed to the external fluid to be heat-exchanged, for example, air in the air heating and/or cooling system.

The heat transfer medium flows through the tubes from one of the tanks to the other. The heat or the cold transported by the heat transfer medium is given to the air through the tube and the fins. Therefore, the tubes and the fins are often referred to as heat exchange tubes and heat exchange fins, respectively. The heat exchange fins serve to increase the area of a heat exchanging surface with which the air comes into contact so as to receive the heat or the cold.

The tubes and the fins are alternately arranged and pre-assembled with the tanks. Each of the tanks is composed of a combination of a tank base member and a tank cover member. Each tank base member is connected to open ends of the tubes. The preassembly of the tubes, fins, and tanks is subjected to a brazing process so as to fix or bond the tubes, fins, and tanks to one another to form an integral structure of the heat exchanger.

Each of the tubes comprises a pair of formed plates by pressing or molding. Each of the formed plates has a peripheral flange portion and a plurality of protrusions. Both of the formed plates have the protrusions. Each of the protrusions has a through-hole formed in a top end surface thereof.

When the preassembly is constructed, the formed plates are coupled to each other to form each tube. During carrying out the brazing process, flux is melted and flows into the interior of each tube through the through-holes and bonds or fixes the peripheral flange portions of both of the formed plates to each other so that the tube is sealed in a fluid-tight condition, as is already proposed in a copending U.S. patent application Ser. No. 505,850 filed on Jul. 24, 1995.

In the brazing process, a noncorrosive flux is used, which is available in commerce from ALCAN Corporation (Canada) under the trade name of "NOCOLOK FLUX".

However, In the above-mentioned technique, a brazing defect is often caused to occur if the brazed parts are not coated with a sufficient amount of the noncorrosive flux.

SUMMARY OF THE INVENTION

It is therefore an object of this invention to provide a heat exchanger having an improved durability with a brazing defect suppressed.

It is another object of this invention to provide a method of manufacturing a heat exchanger, which is capable of avoiding occurrence of a brazing defect resulting from shortage of a brazing flux.

A heat exchanger to which this invention is applicable comprises a plurality of tubes for flowing a heat transfer medium, a plurality of fins arranged between and attached onto the tubes, and tanks connected to the tubes which are brazed by noncorrosive flux to one another. Each of the tubes comprises a pair of formed plates coupled to each other, the formed plates having peripheral flange portions which are brought into contact with each other to form a fluid-tight sealed tube, and a plurality of protrusions formed at an inside thereof and having through-holes in top ends thereof, the protrusions of the formed plates being in face-to-face contact with each other. The flux is attached to the heat exchanger in an amount rate of 3 $g/m^2$ or more on the base of the total area of the outer surfaces and inner surfaces of the tanks, fins and tubes.

A method to which this invention is applicable is for manufacturing a heat exchanger by brazing a provisional assembly of a plurality of tubes for flowing a heat transfer medium, a plurality of fins arranged between and attached onto the tubes, and a tank connected to the tubes. The method comprises steps of: forming a plurality of pairs of plates, as formed plates, each of which has a peripheral portion for fluid-tight sealing each tube, and a plurality of protrusions formed on an inside thereof, each of the protrusions having a hole in a top end thereof; coupling each pair of the formed plates to form each tube so that the protrusions formed on one of the formed plates are in face-to-face contact with those formed on the other formed plate, respectively; alternately arranging the tubes and the fins; coupling the tubes to the tank to form the provisional assembly; coating an outer surface of the core assembly with a non-corrosive flux in an amount rate of 3 $g/m^2$ or more on the base of the total area of the outer surfaces and inner surfaces of the tanks, fins and tubes; and heating the provisional assembly with the flux coating to a brazing temperature to braze the provisional assembly to form the heat exchanger.

DESCRIPTION OF THE PREFERRED EMBODIMENT

Figure 1:
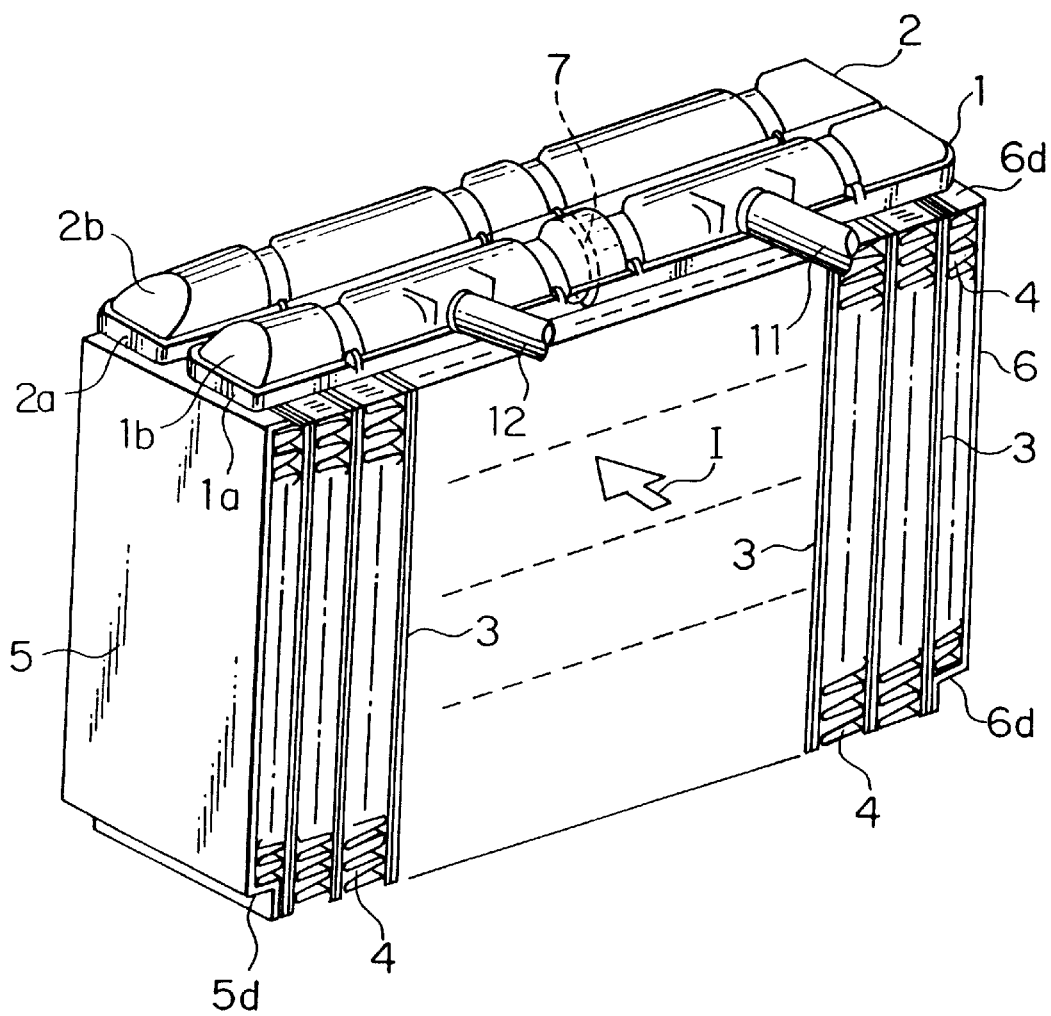
FIG. 1 is a perspective view of a heat exchanger according to one embodiment of the present invention.
Figure 2:
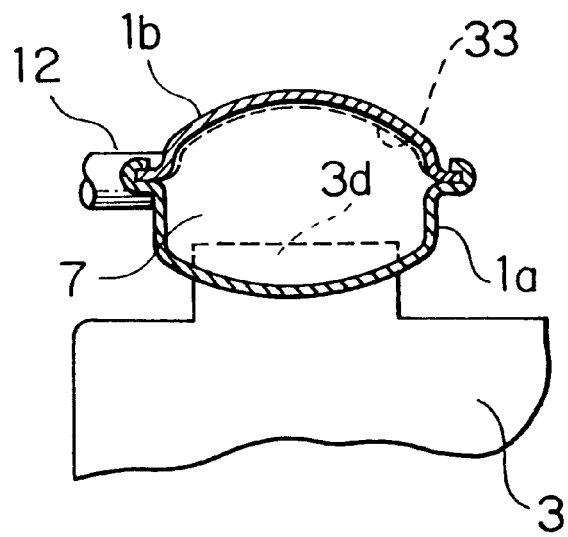
FIG. 2 is a partial sectional view of the heat exchanger in FIG. 1 with a partition member attached to a first tank.

Referring to FIGS. 1 and 2, the heat exchanger according to an embodiment of the present invention comprises a pair of first and second tanks 1 and 2 for distributing and collecting a heat transfer medium, a plurality of heat exchange tube elements (hereinafter simply referred to as tubes) 3 connected to the first and the second tanks, and a plurality of fins 4 arranged adjacent to the tubes and having outer surfaces exposed to heat exchange air.

The tubes 3 and the fins 4 are alternately arranged and assembled together to form an integral structure. A pair of side plates 5 and 6 are attached to both sides of the integral structure, namely, to leftmost and rightmost ones of the fins 4, respectively.

The first and the second tanks 1 and 2, the tubes 3, and the fins 4 are provisionally assembled or pre-assembled and then permanently bonded by brazing. Brazing is carried out in a heating apparatus, such as an electric furnace and a gas furnace, at a predetermined temperature.

Each of the first and the second tanks 1 and 2 and the tubes 3 comprises a two-layer plate composed of a core member such as an aluminum plate and a brazing member as a coating member coating one surface of the core member. For example, the core member is formed by a material specified by JIS (Japan Industrial Standard) A3003.

As a material for each of the first and the second tanks 1 and 2 and the tubes 3, use can also be made of a cladding plate comprising a core member surrounded by a coating member of a brazing material.

In the heat exchanger, the first and the second tanks 1 and 2 are arranged in parallel to each other with their longitudinal direction perpendicularly intersecting an airflow depicted by an arrow I in the figure. In other words, the first and the second tanks 1 and 2 are arranged before and behind with respect to the airflow I.

Each of the first and the second tanks 1 and 2 is composed of a pair of pan-like members formed by press-forming a plate material.

Specifically, the first tank 1 comprises a first tank base member 1a of a pan-like shape and a first tank cover member 1b of a pan-like shape coupled thereto. The first tank base member 1a is connected to one open ends 3d of the tubes 3.

The one open ends 3d of the tubes 3 are located inside the first tank base member 1a.

Likewise, the second tank 2 comprises a second tank base member 2a and a second tank cover member 2b coupled thereto. The second tank base member 2a is connected to the other open ends 3d of the tubes 3. The other open ends 3d of the tubes 3 are located inside the second tank base member 2a.

The first and the second tanks 1 and 2 have Internal spaces through which a heat transfer medium flows. The first tank 1 is provided with a single partition member 7 which inhibits the flow of the medium across the partition member 7. The partition member 7 has a flat shape and is formed by, for example, an aluminum plate. The aluminum plate may have one surface coated by a brazing member.

The partition member 7 is arranged within the first tank 1 to divide the internal space of the first tank 1 into first and second chambers independent from each other. Specifically, the partition member 7 is arranged in the first tank 1 at its approximate center in the longitudinal direction. The partition member 7 is bonded to the first tank 1 to completely isolate the first and the second chambers from each other.

Referring to FIG. 2, description will be made about a fitting structure between the partition member 7 and the first tank 1. A fitting groove 33 is formed at a predetermined position in the internal surface of the first tank cover member 1b to fit the partition member 7 therein.

The first tank 1 is connected to an inlet pipe 11 for introducing the medium thereinto and an outlet pipe 12 for discharging the medium therefrom. Specifically, the inlet pipe 11 and the outlet pipe 12 are connected to the first tank 1 at positions slightly offset rightward and leftward from the longitudinal center of the first tank 1, respectively. As described above, the internal space of the first tank 1 is separated by the partition member 7 at the center between the inlet and the outlet pipes 11 and 12 to inhibit the flow of the medium across the partition member 7.

In the heat exchanger described above, the circulation of the medium is as follows. Specifically, the medium decompressed by an external expansion valve is introduced through the inlet pipe 11 into the first tank 1 and flows through the tubes 3, the second tank 2, the tubes 3, and back to the first tank 1 to be discharged from the outlet pipe 12. In the meanwhile, heat exchange air flows outside of the fins 4 as depicted by the arrow I. Heat exchange is performed between the air and the medium flowing through the tubes 3.

Figure 3:
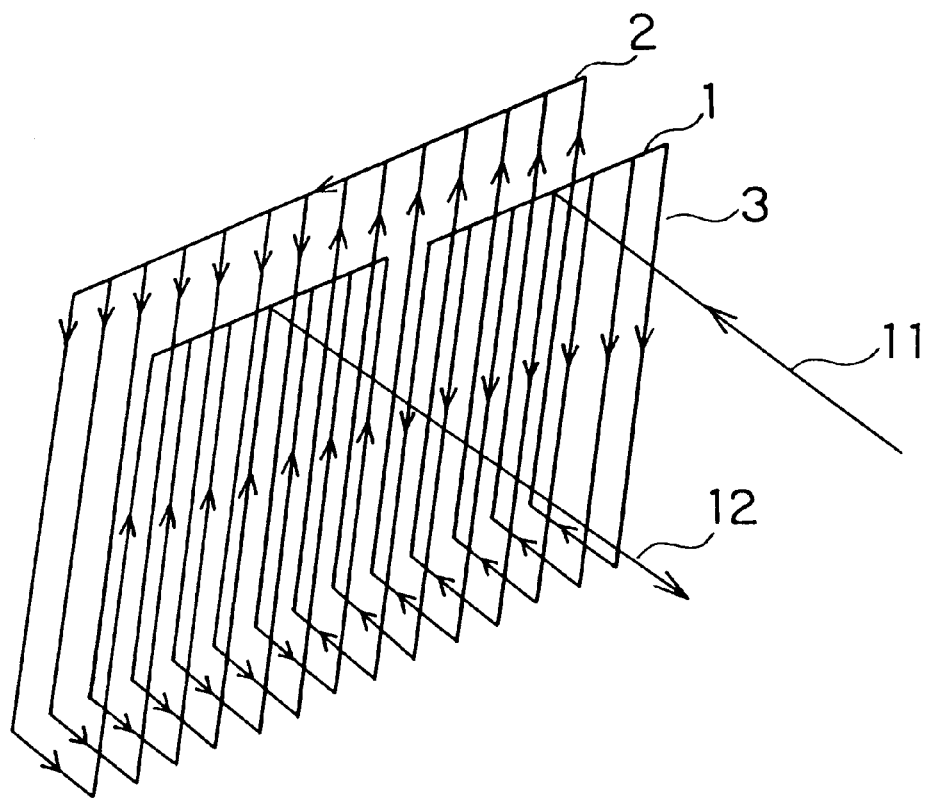
FIG. 3 is a view for describing the flow of a medium in the heat exchanger in FIG. 1.

Referring to FIG. 3, a medium flow circuit in the heat exchanger will be described. The medium flow circuit comprises four circuit portions. The flow of the medium is depicted by solid arrows.

The medium flow circuit illustrated in the figure includes the first and the second tanks 1 and 2, the tubes 3, the inlet and the outlet pipes 11 and 12 all of which are symbolically shown by solid lines.

As illustrated in FIG. 3, the medium introduced through the Inlet pipe 11 is led into the first chamber of the first tank 1 because of presence of the partition member 7 separating the internal space of the first tank 1. Then, the medium flows through the tubes 3 of a U-shape to be led into an approximate half of the second tank 2 in the longitudinal direction.

The above-mentioned flow of the medium comprises the two circuit portions, namely, the downward flow and the upward flow righthand in FIG. 3.

Thereafter, the medium is led to another approximate half of the second tank 2 and then passes through the tubes 3 of a U-shape into the second chamber of the first tank 1 to be discharged through the outlet pipe 12.

The above-mentioned flow of the medium comprises another two circuit portions, namely, the downward flow and the upward flow lefthand in FIG. 3.

Figure 4:
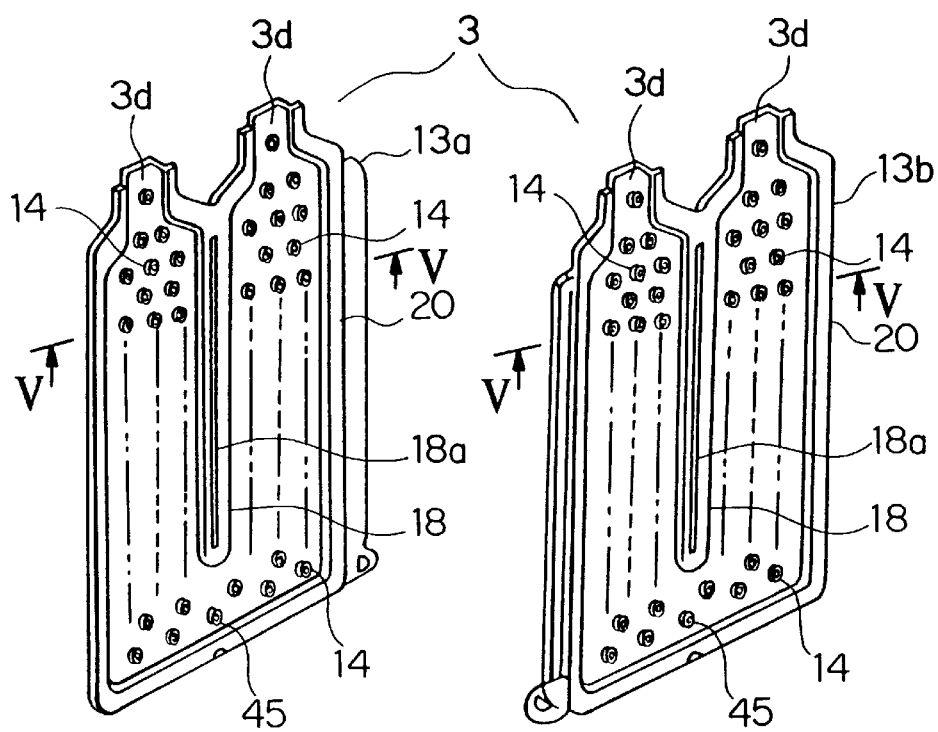
FIG. 4 is a perspective view of a pair of formed plates before coupled to form each tube of the heat exchanger in FIG. 1.
Figure 5:
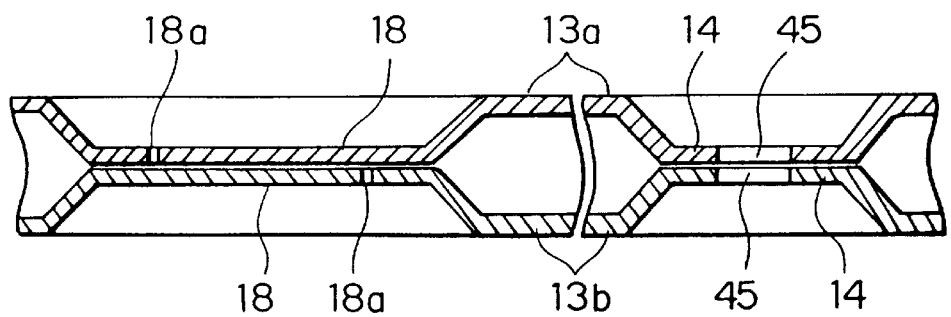
FIG. 5 is a sectional view of the formed plates illustrated in FIG. 4 after the plates are coupled taken along a Line V—V of FIG. 4.

Referring to FIGS. 4 and 5 in addition, each of the tubes 3 comprises a pair of plates 13a and 13b, as formed plates, formed by the press-forming process or the molding process. Each of the formed plates 13a and 13b has an internal surface surrounded by a peripheral portion 20 and provided with a plurality of first protrusions 14 of a bottomed cylinder shape. The first protrusions 14 are arranged on both of the formed plates 13a and 13b in an identical arrangement. Each of the first protrusions 14 has a through-hole or communicating hole 45 formed at the center of a top surface thereof.

A second protrusion 18 is formed at the center of each of the formed plates 13a and 13b and extends in a longitudinal direction. The second protrusion 18 has a slit 18a. Alternatively, a raised cut may be formed instead of the slit 18a.

The formed plates 13a and 13b of the above-mentioned structure are coupled to each other to form each tube 3 of a flat shape. In this event, the first protrusions 14 formed on the one formed plate 13a are brought into face-to-face contact with those formed on the other formed plate 13b in one-to-one correspondence. Likewise, the second protrusion 18 formed on the one formed plate 13a is brought into face-to-face contact with that formed on the other formed plate 13b. It is noted here that the first protrusions 14 serve to disturb the flow of the heat transfer medium in each tube so that a liquid phase and a gas phase are well mixed. The second protrusion 18 defines a U-shaped space within each tube as a passage of the heat transfer medium.

In order to assemble the heat exchanger, the formed plates 13a and 13b are prepared by press-forming or the like and coupled to each other to form each tube 3. A plurality of the tubes 3 and the fins are alternately arranged to form an integral structure. Then, the integral structure is coupled with the first and the second tanks 1 and 2 to form a provisional assembly which may be referred to as a core assembly. Then, the provisional assembly is subjected to a brazing process using a noncorrosive flux such as "NOCOLOK FLUX". Specifically, the peripheral portion 20, the first protrusions 14, and the second protrusion 18 of the formed plate 13a are permanently bonded by the use of a brazing member to those of the other formed plate 13b, respectively.

Figure 6:
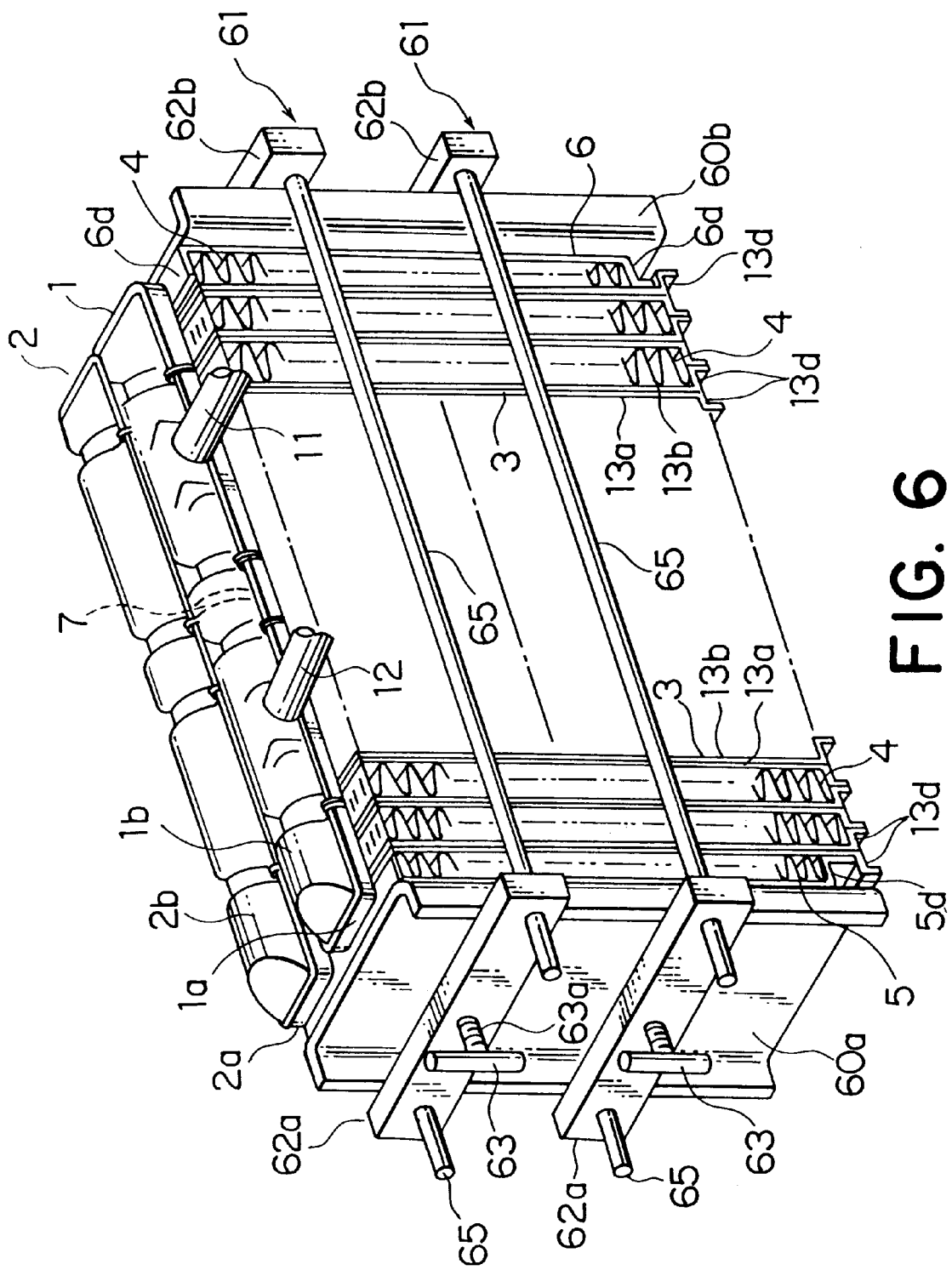
FIG. 6 is a perspective view of the heat exchanger illustrated in FIG. 1 in a provisionally assembled condition.

Referring to FIG. 6, an assembling operation of the heat exchanger in FIG. 1 will be described in greater detail. Summarizing, the provisional or core assembly is at first formed. Then, the noncorrosive flux is applied onto the outer surface of the provisional assembly to penetrate or permeate to the brazed parts.

Specifically, each of the formed plates 13a and 13b has a three-layer cladding structure comprising a core member having opposite surfaces coated with brazing members. For example, the core member is made of an Al-Mn based material (such as JISA 3003 NA) or an Al-Mn-Cu based material. The brazing members may be made of an Al-Si based material. As the fins 4, use is made of an Al-Mn based material (such as JISA 3003) or an Al-Mn-Zn based material. The noncorrosive flux comprises a compound containing calcium fluoroaluminate, for example, a $KaF_4 \cdot K_3AlF_6$ eutectic crystal. Alternatively, the noncorrosive flux may be a fluoride-based flux with which an Al alloy is coated (see Japanese Unexamined Utility Model Application No. 67984/1986).

Referring to FIG. 6, the core assembly (heat exchanger) is formed by the use of an assembling jig. As illustrated in the figure, the jig extends in a transversal direction in the figure and surrounds the core assembly. The jig comprises a pair of left and right holding plates 60a and 60b of a longitudinal bracket shape and a pair of upper and lower support frames 61 of a rectangular shape. Each of the upper and the lower support frames 61 comprises a pair of connecting bars 65 parallel to each other and connected by a pair of left and right fixing plates 62a and 62b of a rectangular shape.

Each of the left fixing plates 62a is provided with a threaded hole formed at its center. A T-shaped bolt 63 is fitted into the threaded hole. Specifically, a shaft portion 63a of the T-shaped bolt 63 is screwed into the threaded hole to penetrate through the left fixing plate 62a. The shaft portion 63a has a flat top end which is moved in the transversal direction in the figure following the rotation of the T-shaped bolt 63.

On the other hand, the core assembly is formed. Specifically, a plurality of the tubes 3 are arranged in parallel in the transversal direction in the figure to form a tube array The side plates 5 and 6 are arranged on both sides of the tube array. A plurality of the fins 4 are arranged between the tubes 3, between the leftmost tube 3 and the side plate 5, and between the rightmost tube 3 and the side plate 6.

As illustrated in FIG. 6, each of the formed plates 13a and 13b is provided with a step portion 13d formed by perpendicularly bending its bottom end. Each step portion 13d supports the lower end of each fin 4 between the tubes 3. Likewise, each of the side plates 5 and 6 is provided with a step portion 5d formed by perpendicularly bending its bottom end. The step portions 13d of the outermost formed plates 13a and 13b support the bottom ends of the side plates 5 and 6, respectively. In addition, the step portions 5d of the side plates 5 and 6 support the lower end of the leftmost and the rightmost fins 4, respectively. The step portions 13d and 5d serve to prevent the fins 4 from undesirably releasing from engagement with the tubes 3 and the side plates 5 and 6.

Finally, the first and the second tanks 1 and 2 are arranged on the tubes 3 and the side plates 5 and 6 In parallel to each other. The tubes 3 and the first and the second tanks 1 and 2 are provisionally fixed so as to communicate with each other.

Preliminarily, the partition member 7, the inlet pipe 11, and the outlet pipe 12 are provisionally fixed to the first tank 1 located at a front side.

After the core assembly is provisionally assembled as mentioned above, each of the T-shaped bolts 63 inserted through each of the support frames 61 is rotated to define a wide space within each support frame 61 for reception of the core assembly. Then, the upper and the lower support frames 61 are arranged in parallel to each other in a vertical direction with the core assembly received within the support frames 61. Between the side plates 5 and 6 and the left and the right fixing plates 62a and 62b, the left and the right holding plates 60a and 60b are inserted. Thereafter, the T-shaped bolts 673 are rotated to clamp the core assembly between the left and the right holding plates 60. Thus, core assembly is formed.

Figure 7:
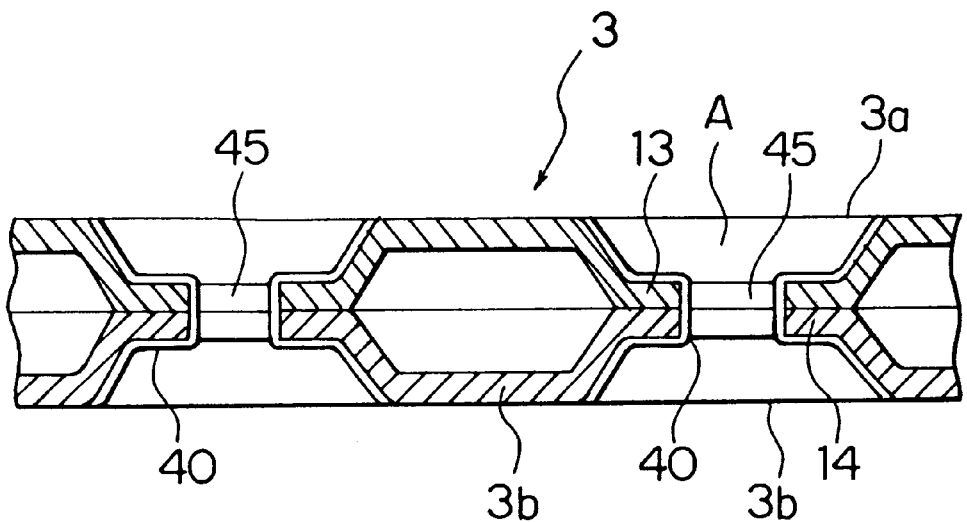
FIG. 7 is a sectional view of the tube in FIG. 6 in a flux-coated condition during a brazing process.
Figure 8:
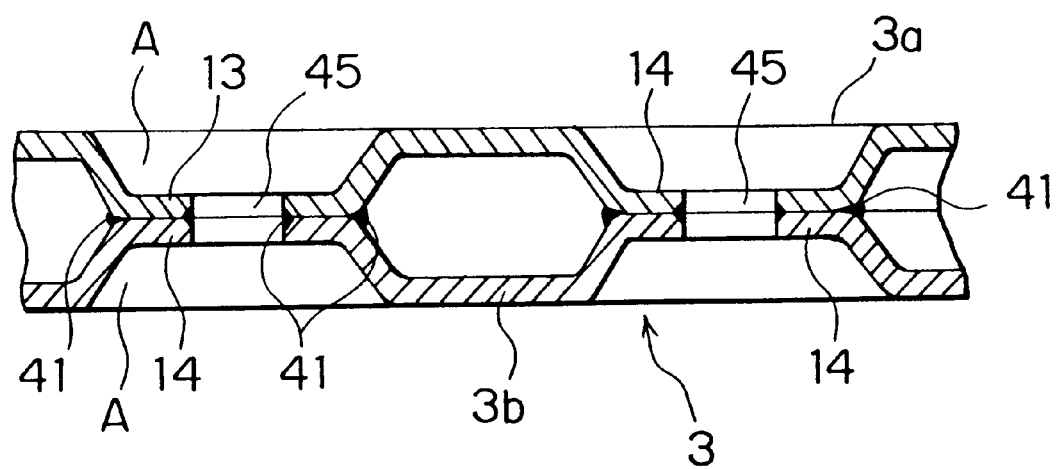
FIG. 8 is a sectional view of the tube in FIG. 6 in a brazed condition during the brazing process.

Referring to FIGS. 7 and 8, the brazing process is carried out after the core assembly is fixedly clamped by the jig. In the brazing process, a noncorrosive flux 40 is at first applied onto the outer surface of the core assembly including the first and the second tanks 1 and 2, the side plates 5 and 6, the tubes 3, and the fins 4. Application of the noncorrosive flux 40 can be carried out in various manners. For example, the flux 40 is solved in water or alcohol to prepare 4 to 10 water solution or alcohol solution which is sprayed onto the outer surface of the core assembly. Alternatively, the flux 40 in a powdery phase may be electrostatically applied or simply applied without electrostatically charging the core assembly. Use of the flux in a powdery phase is advantageous because a subsequent drying process becomes unnecessary. At any rate, the use of the flux in a liquid phase or a powdery phase is selected with reference to a brazing condition In the subsequent brazing process.

When the flux 40 is applied onto the outer surface of the core assembly, the flux 40 Is spread from the outer surface to the peripheral portions 20 of the formed plates 13a and 13b. Further, the flux 40 penetrates or permeates through the communicating holes 45 into the inside of the tubes 3 around the first protrusions 14. Still further, the flux 40 penetrates or permeates through the slits 18a into the inside of the tubes 3 around the second protrusions 18.

After the flux 40 is applied, the core assembly provisionally assembled is located in the furnace for brazing in an inert gas atmosphere. It is noted here that the brazing may be carried out in any other well-known brazing technique. As a result of the brazing, a large number of fillets are formed around top surfaces of the first protrusions 14, around top surfaces of the second protrusions 18, and around the peripheral portions 20, all of which are face-to-face contact with each other.

The communicating holes 45 and the slit 18a are preliminarily formed in the formed plates 13a and 13b during the press-forming process by the use of a punch. As the flux 40 penetrates or permeates through the communicating holes 45 of the first protrusions 14, the slits 18a, and the outer surface of the core assembly, the first protrusions 14, the second protrusions 18, and the peripheral portions 20 are brazed to each other, respectively.

As illustrated in FIG. 8, a large number of the fillets 41 of the flux 40 are formed around a projecting portion A. Thus, a sufficient brazing strength is assured without directly applying the flux 40 to the inside of the tubes 3.

In order to evaluate the reliability of brazing, it is desired to examine each brazed part. However, each of the formed plates 13a and 13b includes several hundreds of the first protrusions 14. In addition, the first protrusions 14 on the formed plates 13a and 13b are face-to-face contact with each other. Therefore, examination of each brazed part requires much labor and is not practical.

In view of the above, the reliability of brazing was evaluated in a simple burst test. Specifically, the heat exchanger was filled with water until it was broken at a certain water pressure. At that time, the certain water pressure was measured as a critical burst pressure. In addition, broken parts were observed.

Figure 9:
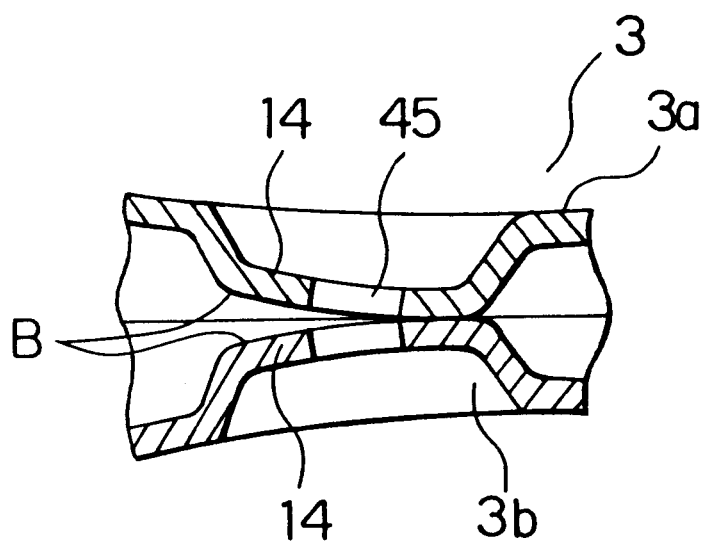
FIG. 9 is a sectional view of the tube when a first protrusion formed on one formed plate is partially detached from that on the other formed plate.
Figure 10:
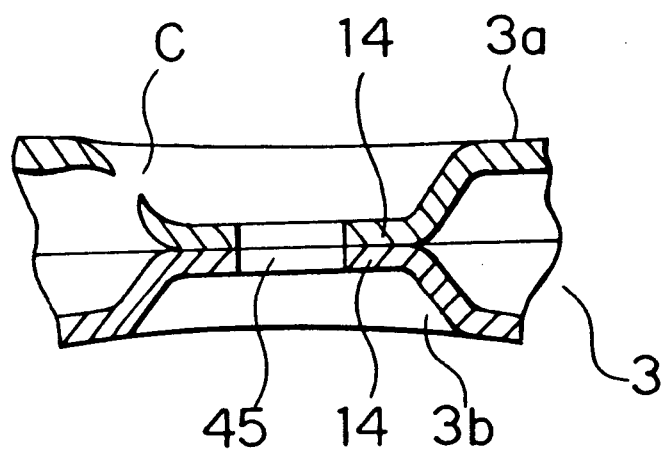
FIG. 10 is a sectional view of the tube when the first protrusion on the one formed plate is interrupted.

As illustrated in FIG. 9, if the brazing is insufficient, contacted portions B of the top end surfaces of the first protrusions 14 were detached by the water pressure. On the contrary, if the brazing is sufficient, the first protrusion 14 is interrupted to cause a broken part C as illustrated in FIG. 10.

A plurality of heat exchangers having the same dimensional specification were produced by the above mentioned method but using different amount of flux, and were subjected to the burst test. The critical burst pressure as measured are demonstrated in FIG. 11. In the figure, an ordinate and an abscissa represent the critical burst pressure (kg/ $cm^2$G) and the amount (g) of flux coated for one unit of the heat exchanger unit coating amount, respectively.

If the heat exchanger is used as an evaporator for an automobile air conditioner, the pressure of the evaporator sometimes exceeds 30 kg/$cm^2$G because the temperature within a car compartment reaches 80° C. or more under the blazing sun in summer. Therefore, the evaporator is typically designed to be durable against the pressure around 40 kg/$cm^2$. Accordingly, it will be understood from FIG. 11 that it is desired to use the flux of 5.5 g or more for one unit of the heat exchanger so as to obtain a reliable strength of the heat exchanger.

Figure 11:
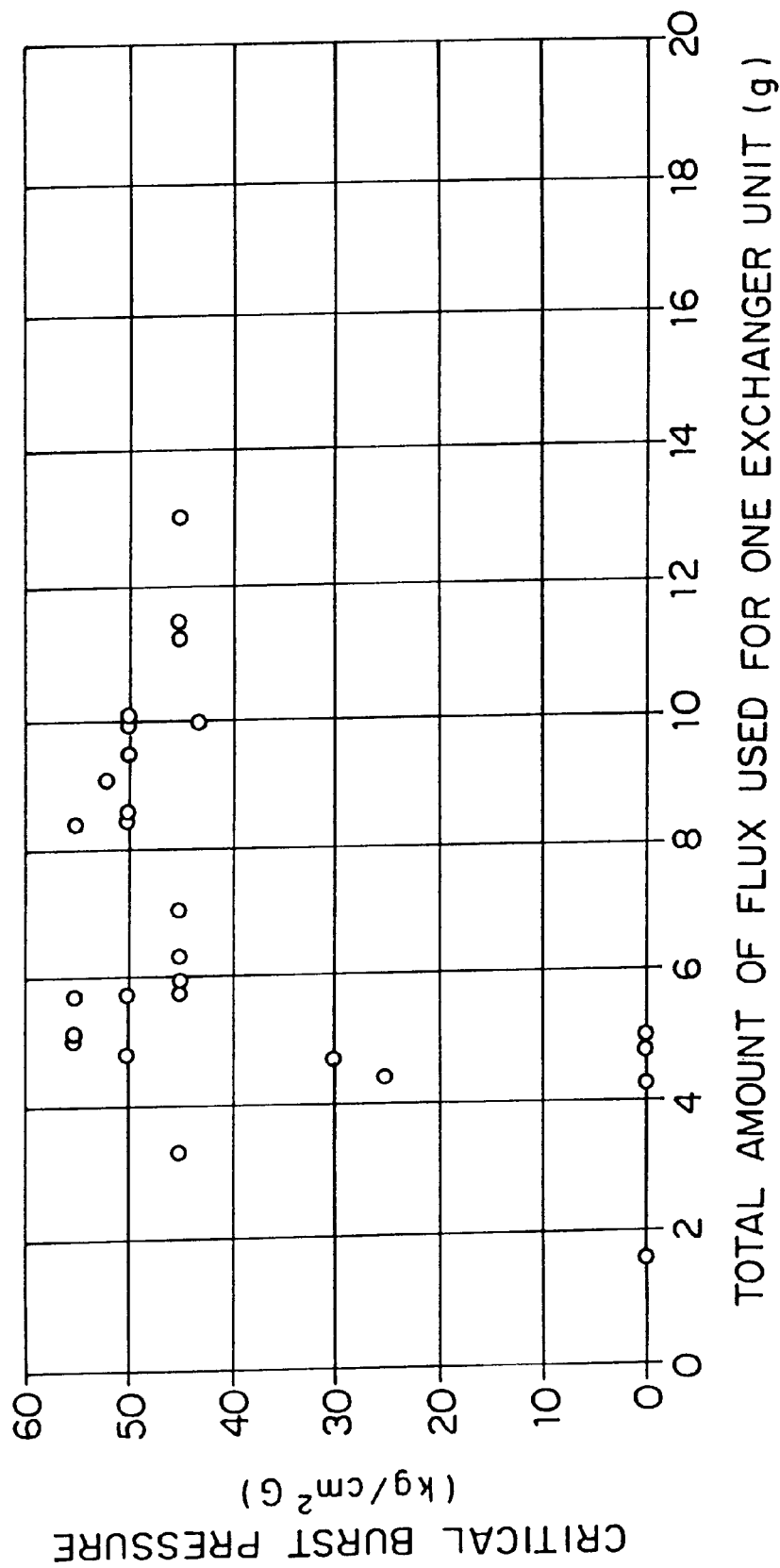
FIG. 11 is a graph showing a relationship between a critical burst pressure of the tube and total amount flux used for one exchanger unit.
Figure 12:
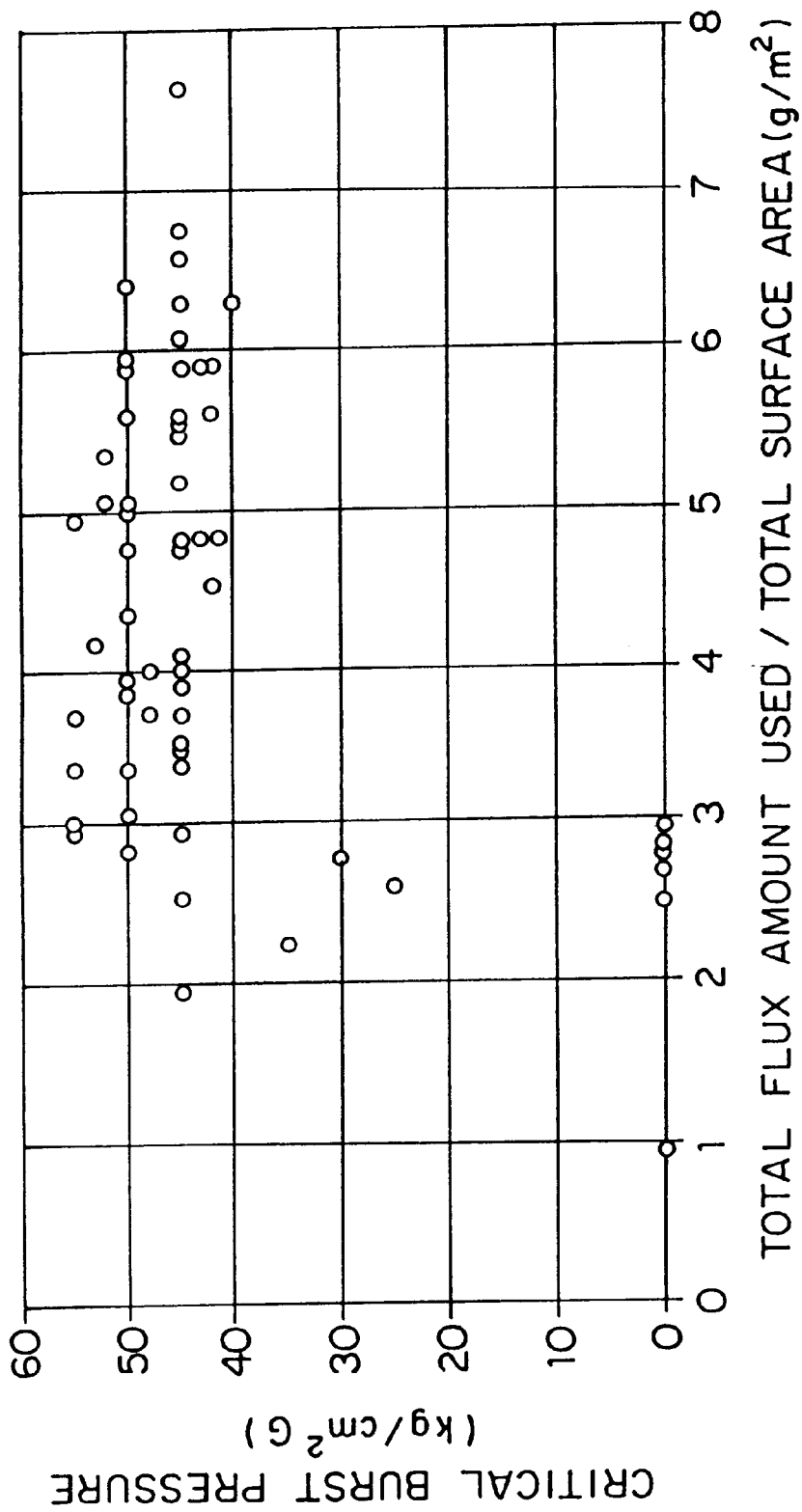
FIG. 12 is a graph showing a relationship between a critical burst pressure of the tube and a flux amount rate for an unit area of the total area of the outer surface and the inner surface of one exchanger unit.

Considering a fact that the flux flows on the outer surface of the core assembly and into the interior of the tubes to bond the components of the core assembly by the brazing process, a calculation was carried out, from the data shown in FIG. 11, as regards the flux amount rate to be used for a unit area ($m^2$) of the total surface area including the outer surfaces of the tubes, fins and tanks to be brazed and the inner surfaces of the tubes. The total surface area was given 1.7 $m^2$ from the designed dimensions of the heat exchanger. The calculated data are shown in FIG. 12. In the figure, an ordinate and an abscissa represent the critical burst pressure (kg/$cm^2$G) and the amount (g) of flux used for a unit area (1 $m^2$) of the total surface are of one unit of the heat exchanger unit, respectively. It will be understood from FIG. 12 that use of flux amount rate of 3 g/$m^2$ or more is desired to insure the critical burst pressure of 40 kg/$cm^2$G.

Figure 13:
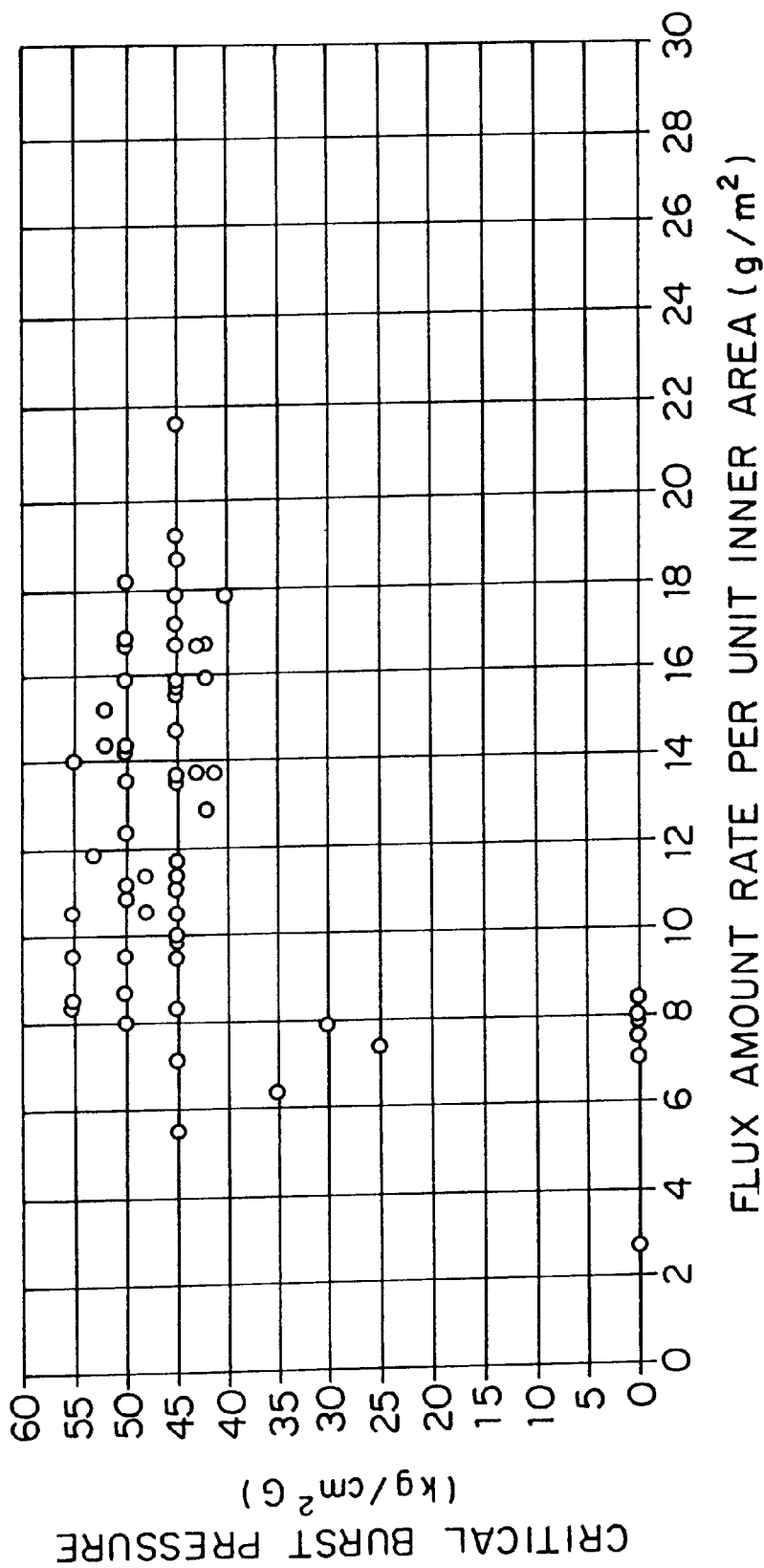
FIG. 13 is a graph showing a relationship between the critical burst pressure of the tube and a flux amount rate per unit inner surface.

Also, from the data in FIG. 11, a flux amount rate used was calculated on the base of the inner surfaces of the tubes. The inner surfaces of tubes are also given 0.6 $m^2$ from the designed dimensions. The calculated values are shown in FIG. 13. In the figure, an ordinate and an abscissa represent the critical burst pressure (kg/$cm^2$G) and the flux amount rate per one unit area of the inside surfaces of the tubes (g/$m^2$), respectively. From the figure, the flux amount rate of 9 g/$m^2$ or more is desired to insure the reliability of 40 kg/$cm^2$G or more, on the base of the inner surface area of the tubes.

Figure 14B:
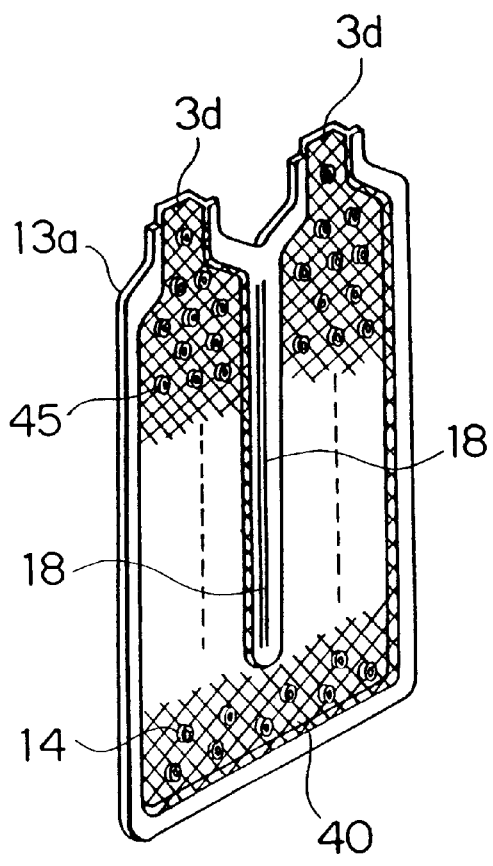
FIGS. 14A and 14B are perspective views of the formed plate for describing a coated area used in calculating the unit coating amount.
Figure 14A:
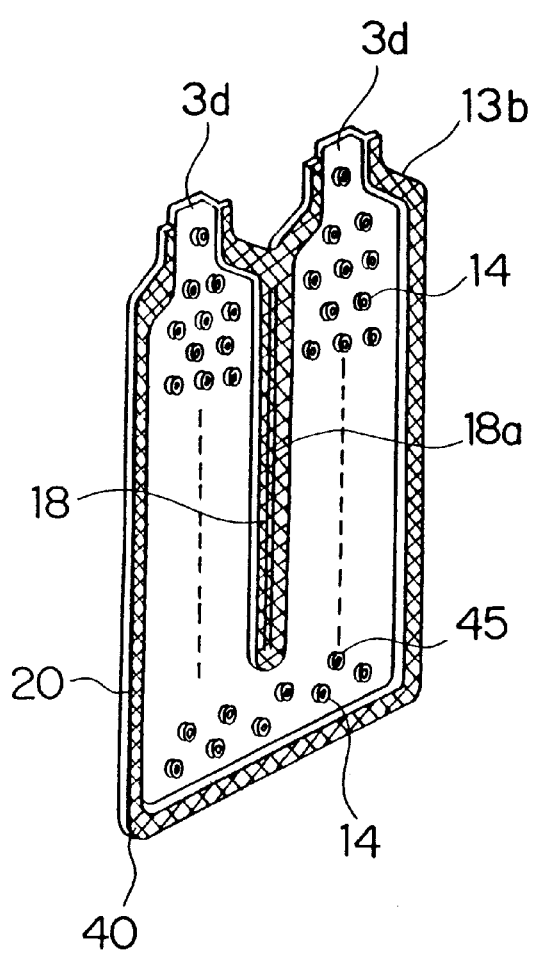

Referring to FIGS. 14A and 14B, the "inner area" of each of the tubes will be described. The area is of a total area of regions cross-hatched in the figure. The inner area includes those portions of the formed plates 13a and 13b to be face-to-face contact with each other, namely, the peripheral flange portions 20, the first protrusions 14, and the second protrusions 18 (FIG. 14A) as well as those regions to which the heat transfer medium flowing therein are in contact, namely, the internal surface of the tube 3 (FIG. 14B) except the above-mentioned portions.

When the flux 40 is applied onto the outer surface of the core assembly, the flux 40 is uniformly applied from both sides of the tubes 3. If the contacted portions of the second protrusions 18 at the center of the formed plates 13a and 13b, namely, at the remotest position from the both sides of the formed plates 13a and 13b are widened, penetration or permeation of the flux 40 will be sufficient and effective.

As described above, in the heat exchanger according to this invention, the flux 40 is not directly applied to the formed plates 13a and 13b. Instead, the communicating holes 45 and the slits 18a are formed in the first and the second protrusions inside the formed plates 13a and 13b. After provisional assembling of the core assembly, the noncorrosive flux 40 is applied to the outer surface of the core assembly in an amount rate of 3 g/$m^2$ or more on the base of total area of the outer surfaces of the tubes, fins and tanks and the inner surfaces of the tubes. The flux 40 is heated to be activated and penetrates the brazed parts through the communicating holes 45 and the slits 18a. Thus, by defining the optimum coating amount of the flux required in brazing, it is possible to prevent the brazing defect due to shortage of the brazing member.

What is claimed is:

1. A heat exchanger comprising a plurality of tubes for flowing a heat transfer medium, a plurality of fins arranged between and attached onto said tubes, and tanks connected to said tubes which are brazed by noncorrosive flux to one another, wherein:

each of said tubes comprises a pair of formed plates coupled to each other, said formed plates having peripheral flange portions which are brought into contact with each other to form a fluid-tight sealed tube, and a plurality of protrusions formed at an inside thereof and having though-holes in top ends thereof, said protrusions of said formed plates being in face-to-face contact with each other;

said flux being coated onto only the outer surface of said heat exchanger and attached to said heat exchanger in an amount rate of 3 $g/m^2$ or more on the base of the total area of the outer surfaces and inner surfaces of said tanks, fins and tubes; and said strip-like protrusion extends in a longitudinal direction of each of said formed plates and has a top surface provided with an elongated hole extending in the longitudinal direction, the elongated hole on corresponding strip like protrusions being offset from each other.

2. A heat exchanger comprising a plurality of tubes for flowing a heat transfer medium, a plurality of fins arranged between and attached onto said tubes, and tanks connected to said tubes which are brazed by noncorrosive flux to one another, wherein:

each of said tubes comprises a pair of formed plates coupled to each other, said formed plates having peripheral flange portions which are brought into contact with each other to form a fluid-tight sealed tube, and a plurality of protrusions formed at an inside thereof and having though-holes in top ends thereof, said protrusions of said formed plates being in face-to-face contact with each other;

said flux being coated onto only the outer surface of said heat exchanger and attached to said heat exchanger in an amount rate of 3 $g/m^2$ or more on the base of the total area of the outer surfaces and inner surfaces of said tanks, fins and tubes; and said strip-like protrusion extends in a longitudinal direction of each of said formed plates and has a top surface provided with a raised cut extending in the longitudinal direction to thereby form an elongated hole extending in the longitudinal direction, the elongated hole on corresponding strip like protrusions being offset from each other.

3. A method of manufacturing a heat exchanger by brazing a provisional assembly of a plurality of tubes for flowing a heat transfer medium, a plurality of fins arranged between and attached onto said tubes, and a tank connected to said tubes, said method comprising the steps of:

forming a plurality of pairs of plates, as formed plates, each of which has a peripheral portion for fluid-tight sealing each tube, and a plurality of protrusions formed on an inside thereof, each of said protrusions having a through-hole in a top end thereof, said protrusiion comprise a plurality of small protrusions and a strip-like protrusion, said strip-like protrusion extending in a longitudinal direction of each of said formed plates and having a top surface provided with an elongated hold extending in the longitudinal direction;

coupling each pair of said formed plates to form each tube so that said small protrusions formed on one of said formed plates are in face-to-face contact with those formed on the other formed plate, respectively, and the elongated hole formed on one of said formed plates are offset from those formed on the other formed plate, respectively;

alternately arranging said tubes and said fins;

coupling said tubes to said tank to form said provisional assembly;

coating only an outer surface of said core assembly with a noncorrosive flux in an amount rate of 3 $g/m^2$ or more on the base of the total area of the outer surfaces and inner surfaces of said tanks, fins, and tubes; and heating said provisional assembly with said flux coating to a brazing temperature to braze said provisional assembly to form said heat exchanger.

4. A method of manufacturing a heat exchanger as claimed in claim 3, wherein said coating step is carried out by a powder coating technique.

5. A method of manufacturing a heat exchanger as claimed in claim 3, wherein said coating step is carried out by an electrostatic powder coating technique.

* * * * *